Patented Aug. 12, 1952

2,606,815

UNITED STATES PATENT OFFICE 2,606,815

PRODUCTION OF METALLIC NITRIDES

Frank J. Sowa, Cranford, N. J.

No Drawing. Application February 18, 1946,
Serial No. 648,572

13 Claims. (Cl. 23—191)

My invention relates to the production of nitrides, and particularly to methods of producing the nitrides of metals and similar elements in a relatively pure form.

The nitrides of metals, such as boron for example, have been produced heretofore by heating the metal in an atmosphere of nitrogen or ammonia gas. However, such methods are expensive and difficult to control and only relatively poor yields are obtained whereas the products produce are contaminated with the metal and other impurities which are not readily separated from the nitrides. It is also difficult to produce the nitride of many other metals in relatively pure form.

I have discovered that nitrides of metals and similar elements having high purity can be produced by treating the ammonia addition compounds of various metal halides with a caustic alkali and thereafter heating the resulting product. Since ammonia addition compounds of metal halides are required in the practice of my invention, the invention is directed to the production of nitrides of metals which form normal co-valent linkages with halogens and form coordinate co-valent linkages with ammonia. Most important of these elements are boron, beryllium, titanium, silicon, aluminum, zirconium, tantalum and iron, each of which elements is hereafter referred to as "metal."

One of the objects of my invention is to provide novel methods for the production of the nitrides of metals which form normal co-valent linkages with halogens and form coordinate co-valent linkages with ammonia.

A particular object of my invention is to provide novel and economical methods for the production of nitrides of boron, beryllium, titanium, silicon, aluminum, zirconium, and iron.

Another object of my invention is to provide methods for producing metallic nitrides by decomposition of products resulting from the action of an alkali hydroxide on an ammonia addition compound of a metal halide.

A further object of my invention is to provide methods for producing metallic nitrides in which the yield and purity of the product obtained is relatively high.

These and other objects and features of my invention will be apparent from the following description thereof in which specific examples are cited and preferred procedure set forth for the purpose of indicating the nature of my invention but without intending to limit the scope of my invention thereby.

The ammonia addition compounds of metal halides such as the halides of boron, beryllium, titanium, silicon and other metals are known and may be produced in various ways. Thus, for example, they are suitably obtained by reacting the metal halide with gaseous or liquid ammonia. They may also be produced by passing boron fluoride, silicon fluoride, boron chloride or the vapors of other volatile metal halides into aqueous ammonia hydroxide.

Such addition compounds may be represented by the general formula $$(NH_3)_a MX_b$$

wherein "a" is a number from 1 to 5 depending upon the metal employed, M is a metal which forms normal co-valent linkages with halogens and coordinate co-valent linkages with ammonia, X is a halogen, and "b" is a number, generally 2, 3 or 4, depending upon the metal employed. Specific ammonia addition compounds of this character are $$NH_3BF_3, (NH_3)_2SiCl_4, (NH_3)_5TiCl_4, NH_3BeF_2$$

Numerous other ammonia addition compounds are known or can be produced. Thus, when using silicon tetrachloride the addition compound may contain 3, 4, 5 and in some cases probably 6 ammonia groups. However, many of the addition compounds having a high ammonia content are unstable and tend to break down into the lower forms of the compounds with liberation of ammonia. Therefore, the lower forms of the ammonia addition compounds are generally more practical for use.

One very satisfactory method to prepare these compounds may be carried out by adding the metallic halide to liquid ammonia followed by evaporation of the excess ammonia to obtain the solid addition compounds. The resulting addition compounds contain from 1 to 5 molecules of ammonia for each molecule of the metal halide used depending upon the amount of ammonia employed in the reaction. When ammonia is used in large excess the addition compounds frequently contain more than one molecule of ammonia, and when using silicon tetrachloride addition compounds containing five and possibly more molecules of ammonia for each molecule of silicon tetrachloride are produced. On heating ammonia is evolved from these higher forms of the addition compound yielding the lower and more stable compounds such as $$(NH_3)_2SiCl_4$$

In accordance with my invention the ammonia addition compounds of the metal halides are first treated with a caustic alkali such as sodium hydroxide in an aqueous solution. If the halide of the addition compound is fluorine or if a fluoride salt is added to the mixture the reaction results in the formation of a gelatinous precipitate which is insoluble in water and caustic soda solutions but is readily soluble in mineral acids.

The presence of the fluoride ion in the solution appears to be necessary for the formation of the precipitate referred to as particularly exemplified by the action of sodium hydroxide on the ammonium addition products of titanium, boron and silicon chlorides. Mixtures of these materials with aqueous sodium hydroxide do not produce a precipitate from which the nitride can be produced but when the solution of the addition compound contains sodium fluoride addition of caustic soda to the mixture immediately causes the gelatinous precipitate of the present invention to appear. Moreover, although the composition of the precipitates has not been determined they have been found in each instance to contain fluorine. Similar gelatinous precipitates may be produced by treating aqueous solutions of ammonium fluoborate or ammoniacal solutions of sodium and potassium fluoborate with sodium hydroxide. Thus, the gelatinous precipitate may be formed in various ways for use in producing metal nitrides.

The gelatinous products described may be washed and dried if desired, and they may be purified by dissolving them in mineral acid and filtering the solution to remove any insoluble impurities such as foreign matter or metals such as elemental boron or the like. Thereafter, neutralization of the acid solution with sodium hydroxide serves to reprecipitate the reaction product in a substantially pure form.

These reaction products are readily decomposed by heat to form the insoluble nitrides of the metals. Decomposition generally does not take place until the material fuses or has been heated to a temperature above about 500° C. and preferably in the neighborhood of 750° C. to 850° C. Heating at these elevated temperatures usually is continued from about ten to thirty minutes, depending upon the amount and type of material being treated. If the fusion is carried out in the presence of air, the product may be contaminated with metallic oxides which are difficult to separate from the nitrides. For this reason the decomposition is preferably carried out in the presence of an inert atmosphere such as nitrogen, ammonia or hydrogen.

After fusion the product remaining is in the form of a hard brittle mass which may be ground and leached to remove water soluble materials and then consists of substantially pure metal nitride.

In order to indicate the nature of my invention more clearly, the following examples are cited for purposes of illustration, but without intending to limit my invention thereby.

*Example I*

100 grams of $NH_3BF_3$ are dissolved in 200 cc. of water contained in a 400 cc. beaker after which dilute aqueous sodium hydroxide is added until the solution is alkaline. A gelatinous precipitate is formed which is filtered, washed with water and dried at room temperature. The dry material is placed in a steel crucible and heated to 800° C. in an oven and in an atmosphere of nitrogen for about 30 minutes. A hard brittle substance is produced which may be readily ground and is leached well by boiling with water to remove soluble impurities. The product when dried is a white insoluble solid which is substantially pure boron nitrile.

*Example II*

170 grams of $SiCl_4$ are placed in a five liter three-neck flask and 500 cc. of a liquid ammonia contained in a dropping funnel inserted in one of the necks is slowly added to the stirred $SiCl_4$. The reaction is very violent at first but decreases in violence as the addition of liquid ammonia progresses. A white powdery precipitate is formed and the excess ammonia is allowed to evaporate. The residue weighed 247.5 grams and has a composition corresponding to the formula $(NH_3)_5SiCl_4$.

100 grams of this addition compound are dissolved in 200 cc. of water contained in a 600 cc. beaker and an aqueous solution containing 10 grams of sodium fluoride is added thereto. Thereafter a dilute aqueous solution of sodium hydroxide is added until the solution is alkaline whereupon a gelatinous precipitate is formed. This product is filtered, washed with water and air dried at room temperature. The dry material is fused for ten minutes in a stainless steel crucible at 800° C. in an atmosphere of hydrogen gas. The product obtained is leached with water and dried. It is a brownish-white solid consisting of substantialy pure silicon nitride.

*Example III*

An addition compound of $TiCl_4$ and ammonia is prepared by adding 50 grams of $TiCl_4$ slowly to 300 cc. of liquid ammonia in a 1 liter beaker while stirring the mixture. The resulting addition compound is filtered and dissolved in 400 cc. of water contained in a 800 cc. beaker. 50 cc. of an aqueous solution of sodium fluoride containing 20 g. of NaF are added followed by the addition of sufficient sodium hydroxide to render the solution distinctly alkaline to litmus. A gelatinous precipitate is formed and this is separated from the solution by filtration washed three times with water and air dried at room temperature. The dry material is fused in a steel crucible at 750–850° C. in an atmosphere of nitrogen. The product, after being ground and washed well with water, is found to be substantially pure titanium nitride.

*Example IV*

To 200 cc. of an aqueous solution containing 50 grams of $NH_3BeF_2$ in a 400 cc. beaker are added dilute aqueous sodium hydroxide until the reaction mixture is alkaline to litmus. A gelatinous precipitate is formed and separated by filtration and air dried. In forming this precipitate care should be taken to avoid the use of excess caustic soda since the beryllium complex tends to decompose in the presence of alkalies. It was then fused in a steel crucible which had been flushed out with ammonia to retard oxidation of the crucible before closing. The temperature of the fusion was 750° C. The product was a dark brittle mass which after being washed well with water consisted of substantially pure beryllium nitride.

*Example V*

52.5 grams of ammonium fluo-borate $(NH_4BF_4)$ were dissolved in water and 68.75 grams of 28% ammonium hydroxide were added. To this mixture was added 20 grams of sodium hydroxide whereupon a gelatinous precipitate was produced. After drying the reaction product was transferred to a crucible and heated in an atmosphere of hydrogen. The compound first became liquid due to the fluxing action of the excess ammonium fluo-borate present but after heating for an hour the product was allowed to cool. It was a hard brittle gray colored product which was pulverized and washed with water. It consisted of substantially pure boron nitride.

*Example VI*

Boron fluoride ($BF_3$) gas was bubbled through a solution of 28% ammonium hydroxide and then sodium hydroxide was added to the resulting solution whereupon a gelatinous precipitate was formed. This was heated in a stainless steel crucible and after being pulverized and washed resulted in the formation of substantially pure boron nitride.

*Example VII*

Silicon tetrafluoride gas ($SiF_4$) is passed into a solution of 28% ammonium hydroxide after which sodium hydroxide is added to the treated solution producing a gelatinous precipitate. On heating the precipitate in a stainless steel crucible and in an inert atmosphere at temperatures in the neighborhood of 850° C. a hard brittle product is produced. This material is ground, washed thoroughly with water and is substantially pure silicon nitride.

In each of the examples cited there was some tendency for the iron of the crucible to give rise to impurities in the finished product which accounts in some cases for the gray or dark color of the nitride produced. However, the product can be readily purified further to remove the iron by washing with hydrochloric acid in which the metal nitrides are not soluble.

While substantially pure metal nitrides may be produced in accordance with my invention, mixed metallic nitrides also may be made from an unstable complex prepared by treatment of a mixture of two or more addition compounds containing different metals with caustic alkalies or by heating a mixture of the flocculent precipitates described above prior to fusion thereof.

While I have described various preferred methods employed in the practice of my invention the ammonia addition compounds employed can be produced in any way desired and numerous changes and modifications may be made in the manner of carrying out the reactions. In view thereof it should be understood that my invention is not limited to the specific embodiments thereof herein described except as defined by the appended claims.

I claim:

1. A process for preparing nitrides which comprises making alkaline with a caustic alkali a fluoride ion containing solution of an ammonia addition compound of a halide of an element selected from the group of elements which form ammonia addition compounds of their halides and consisting of boron, beryllium, titanium and silicon, heating the resulting reaction product, and separating the resulting nitride from the reaction mass.

2. A process according to claim 1 in which the reaction product is fused at a temperature above about 500° C.

3. A process according to claim 1 in which the reaction product is fused at a temperature of about 750° to 850° C.

4. A process according to claim 1 in which the reaction product is fused at a temperature of about 750° C. to 850° C. for from ten to thirty minutes.

5. A process for preparing nitrides which comprises making alkaline with a caustic alkali a solution of an ammonia addition compound of a fluoride of an element selected from the group of elements which form ammonia addition compounds of their halides and consisting of boron, beryllium, titanium and silicon, fusing the resulting reaction product, and separating the resulting nitride from the reaction mass.

6. A process for preparing nitrides which comprises making alakaline with a caustic alkali a fluoride ion containing solution of an ammonia addition compound of a chloride of an element selected from the group of elements which form ammonia addition compounds of their halides and consisting of boron, beryllium, titanium and silicon, fusing the resulting reaction product, and separating the resulting nitride from the reaction mass.

7. A process for preparing nitrides which comprises the steps of adding sodium hydroxide to an aqueous solution of an ammonia addition compound of a fluoride of an element selected from the group of elements which form ammonia addition compounds of their halides and consisting of boron, beryllium, titanium and silicon until the solution is alkaline to litmus, separating the resultant gelatinous precipitate and drying the same, thereafter fusing the precipitate at a temperature above about 500° C., and separating the resulting nitride from the reaction mass.

8. A process for preparing nitrides which comprises the steps of mixing a fluoride salt with an aqueous solution of an ammonia addition compound of a halide of an element selected from the group of elements which form ammonia addition compounds of their halides and consisting of boron, beryllium, titanium, and silicon, adding sodium hydroxide to the solution until the solution is alkaline to litmus, separating the resultant gelatinous precipitate and drying the same, thereafter fusing the precipitate at a temperature above about 500° C., and separating the resulting nitride from the reaction mass.

9. A process for preparing metallic nitrides which comprises the steps of mixing a fluoride salt with an aqueous solution of an ammonia addition compound of a chloride of an element selected from the group of elements which form ammonia addition compounds of their halides and consisting of boron, beryllium, titanium and silicon, adding sodium hydroxide to the solution until the solution is alkaline to litmus, separating the resultant gelatinous precipitate and drying the same, thereafter fusing the precipitate at a temperature above about 500° C., and separating the resulting nitride from the reaction mass.

10. A process for preparing nitrides which comprises the steps of adding sodium hydroxide to an aqueous solution of an ammonia addition compound of a fluoride of an element selected from the group of elements which form ammonia addition compounds of their halides and consisting of boron, beryllium, titanium, and silicon until the solution is alkaline, separating the resulting gelatinous precipitate, dissolving the precipitate in mineral acid, re-forming the precipitate by neutralizing the acid with an alkali hydroxide, thereafter fusing the purified precipitate at a temperature above about 500° C., and separating the resulting nitride from the reaction mass.

11. A process for preparing nitrides which comprises making alkaline with sodium hydroxide, a fluoride ion containing a compound of the general formula $$(NH_3)_a MX_b$$

where M is an element selected from the group of elements which form ammonia addition compounds of their halides and consisting of boron, beryllium, titanium and silicon, X is a halogen, $a$ is a number from 1 to 5, and $b$ is 2, 3 or 4 fusing the resulting reaction product, and separating the resulting nitride from the reaction mass.

12. A process for preparing nitrides which comprises making alkaline with sodium hydroxide, a solution containing a compound of the general formula $$(NH_3)_a MF_b$$

where M is an element selected from the group of elements which form ammonia addition compounds of their halides and consisting of boron, beryllium, titanium and silicon, F is fluorine, $a$ is a number from 1 to 5, and $b$ is 2, 3 or 4, fusing the resulting reaction product at a temperature above about 500° C. for from ten to thirty minutes, and separating the resulting nitride from the reaction mass.

13. A process for preparing boron nitride which comprises the steps of mixing fluoride salt with an aqueous solution of an ammonia addition compound of a halide of boron, adding sodium hydroxide to the solution until the solution is alkaline to litmus, separating the resulting flocculent precipitate and drying the same, thereafter fusing the precipitate at a temperature above about 500° C. and separating the resulting boron nitride from the reaction mass.

FRANK J. SOWA.

REFERENCES CITED

The following references are of record in the file of this patent:

UNITED STATES PATENTS

| Number | Name | Date |
|---|---|---|
| 1,077,712 | Heyder | Nov. 4, 1913 |
| 1,102,715 | Bosch | July 7, 1914 |
| 2,173,290 | Adamoli | Sept. 19, 1939 |

OTHER REFERENCES

Gmelin Kraut (1912), Hanbuch der Anorganischen Chemie, Band III, abt. 1, page 189.

Hoffman's Lexikon der Anorganische Verbindungen (1919), Band I, 2. Halfte, page 1629.

J. W. Mellor's "Inorganic and Theoretical Chem.," vol. 2, page 137; vol. 4, page 230; vol. 5, pages 125–127; vol. 6, page 938. Longmans, Green & Co., N. Y.

Fritz Ephaim's "Inorganic Chemistry," 4th ed., pp. 279–322. Nordeman Publishing Co., N. Y.